Oct. 27, 1964   R. A. THOMASON ETAL   3,154,042
EMBEDMENT ANCHOR
Filed June 6, 1962   6 Sheets-Sheet 1

INVENTOR.
RICHARD A. THOMASON
THOMAS L. MURPHY
BY
*Robert C. Swan*
ATTORNEY

Oct. 27, 1964 R. A. THOMASON ETAL 3,154,042
EMBEDMENT ANCHOR
Filed June 6, 1962 6 Sheets-Sheet 3

INVENTOR.
RICHARD A. THOMASON
THOMAS L. MURPHY
BY
ATTORNEY

Oct. 27, 1964    R. A. THOMASON ETAL    3,154,042
EMBEDMENT ANCHOR
Filed June 6, 1962    6 Sheets-Sheet 4

INVENTOR.
RICHARD A. THOMASON
THOMAS L. MURPHY
BY

ATTORNEY

United States Patent Office 3,154,042
Patented Oct. 27, 1964

3,154,042
EMBEDMENT ANCHOR
Richard A. Thomason, Westminster, and Thomas L. Murphy, Buena Park, Calif., assignors to Aerojet-General Corporation, Azusa, Calif., a corporation of Ohio
Filed June 6, 1962, Ser. No. 200,432
12 Claims. (Cl. 114—206)

This invention relates to underwater anchors and particularly to propellant cartridge operated embedment anchors.

Because of the serious limitations of conventional anchors and the desirability of making mooring equipment lighter and more reliable, a considerable effort is being made to improve undersea anchoring through the use of propellant driven anchors.

The use of surface and subsurface equipment in deep water has increased at a rapid pace. The cost of the equipment and its placement should be insured with a positive and reliable anchoring system. The anchors constructed according to this invention provide positive anchoring with a high degree of reliability at a fraction of the weight and cost of conventional anchors.

Special requirements such as nonmagnetic or noncorrosive anchors are made possible by using select materials. Long station life can be expected with noncorrosive anchors and chafe resistant cables. The ability to install moorings with little scope reduces the chafe problems to a minimum thereby increasing the over-all station life of the mooring.

It is an object of this invention to provide a propellant operated sea bottom anchor of small size and weight, requiring a minimum of handling equipment and storage space, the compactness of the anchor enabling it to be packaged as a component of a system if desired.

A further objection of the invention is to provide an anchor which penetrates the sea bottom prior to final locking therein and even in hard smooth sea bottom.

Another object of the invention is to provide a sea anchor having omnidirectional holding ability, the vertical holding ability being little less than the maximum for lateral direction of pull, thus obviating the need for scope or slack in the cable required with conventional anchors.

A further object of the invention is to provide a propellant operated sea anchor which is automatically operated after it enters the water so that it may be dropped from moving underwater or surface craft, or from aircraft.

A still further object of the invention is to provide a propellant operated underwater anchor provided with manually, as well as automatically, operated safety devices to provide full safety in storage, handling, and operation.

Another object of the invention is to provide a propellant operated embedment anchor assembled from a plurality of elements, some of which are common to all forms of the anchor, to which common elements others may be assembled in various combinations to enable an anchor best suited to a particular type of sea bottom to be produced.

Still further objects and features of the invention will appear from the following description and accompanying illustrative drawings.

In the drawings:

FIGURE 4 is a fragmentary central longitudinal view, partially in section and similar to FIGURES 1 and 2 but rotated 90°, showing one anchor fluke folded toward the body of the anchor, the other fluke being shown with its axis horizontal as when embedded, the fluke blade being broken to shorten its length.

FIGURE 12 is a cross-section on the line 12—12 in FIGURE 11a.

Referring now to the drawings, wherein like reference characters designate like or corresponding parts throughout the various views, there is shown in FIGURES 1 to 5 the preferred embodiment of the present invention.

Figures 1, 2:
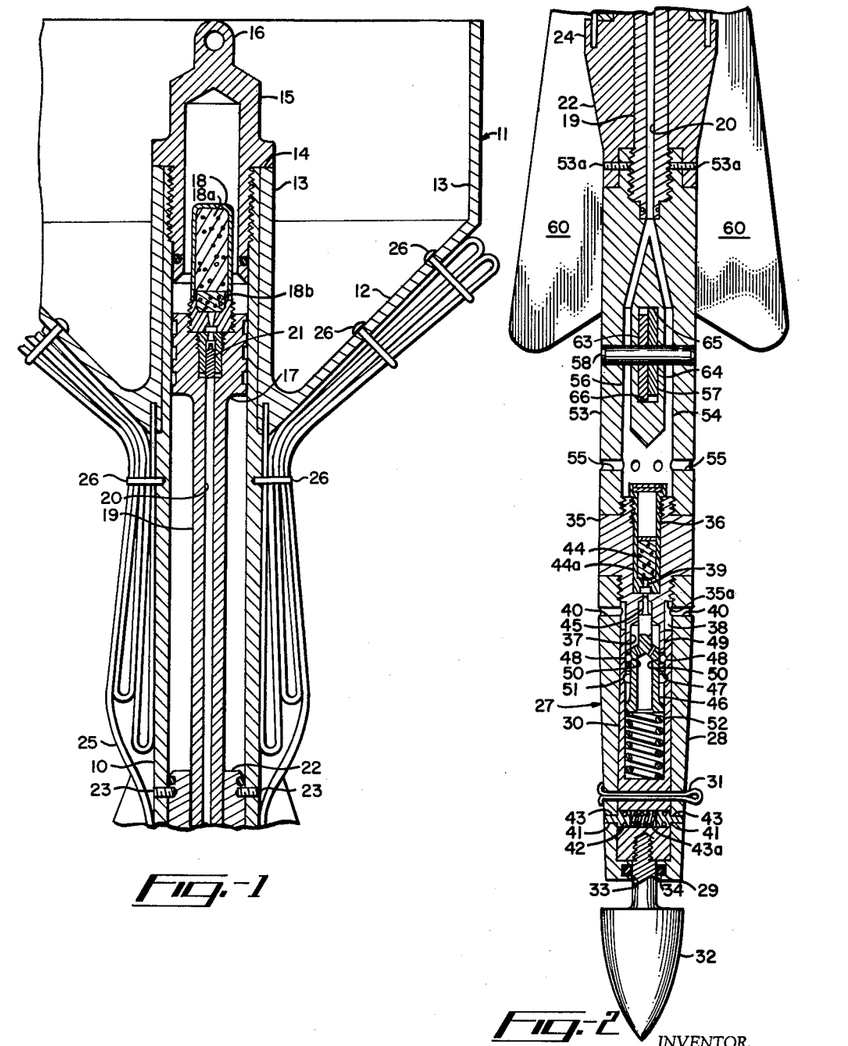
FIGURES 1 and 2 show in central longitudinal section one embodiment of the underwater embedment anchor in which extendable flukes are incorporated, FIGURE 1 showing the upper end of the completely assembled anchor, and FIGURE 2 showing the lower end thereof.

In FIGURE 1, numeral 10 indicates an elongated cylinder carrying a reaction member 11 providing resistance to upward movement of the anchor when a charge of propellant is fired to operate the latter. The reaction member 11 is shown as a casing with a frusto-conical bottom 12 with vertical sides 13 rigidly mounted against a shoulder 14 at the upper end of the cylinder, the weight of the reaction to ensure downward penetration of the lower end of the anchor to the desired depth into the sea bottom when the main charge of the propellant is fired as later described.

The upper end of cylinder 10 is closed by a breech block 15 provided with a mooring eye 16. A piston 17 is fitted in the cylinder and a cartridge 18 is mounted on top of the piston 17. The cartridge contains a main penetration propellant load 18a and igniter material 18b. The piston is formed with a piston rod 19 provided with an axial bore 20. Firing mechanism 21 for cartridge 18 is positioned at the upper end of axial bore 20 and is operated by pressure transmitted thereto through the bore 20 as later explained.

The lower end of cylinder 10 is closed, until the penetration propellant load 18a is fired, by a sliding swivel block 22 held in the end of the cylinder by shear pins 23. The block 22 is bored for slidably receiving the lower end of the piston rod 19. Block 22 extends beyond the end of the cylinder 10 and has an extension 24 of greater diameter than the outside diameter of the cylinder.

Flexible cables 25 several times longer than the distance between the base of the reaction member 11 and the block 22 are secured at each end to said reaction member 11 and block 22 and intermediate the ends to the cylinder 10, the cables being held in folded condition by readily broken ties 26 until the propellant 18a is fired.

A fuse body member is associated in all modifications of the embedment anchor with cylinder 10, reaction body 11, and piston rod 19, and will now be described as the fuse body in the embodiment of the invention shown in FIGURES 1 and 2, but it is to be remembered that the fuse body is differently positioned in other embodiments of the invention.

The fuse body indicated by numeral 27 comprises a tubular case 28 having a closed lower end 29 and in which is housed a sleeve 30 held against movement by a manually operable pull pin 31. A striker 32 is screwed into the end of the sleeve 30 and extends through a hole 33 in the end of the fuse body 27, an O-ring seal 34 being provided for the stem of the striker 32.

A fuse base 35 having an upper chamber 36 and a lower chamber 37 in a reduced diameter portion thereof which fits within the sleeve 30 is screwed into the upper end of the fuse body 27. A circumferential space 38 is provided between the end of the sleeve 30 and a shoulder 35a on the fuse base. Chambers 36 and 37 are connected by a passage 39.

Ports 40 are provided through the wall of the fuse body 27 admitting sea water into the space 38 to balance the hydrostatic pressure on the striker when free to move and before the striker impacts the sea bottom.

The striker 32 and sleeve are held against movement until the anchor is at a predetermined distance below the surface by hydrostatically freed detents 41 mounted in a transverse bore 42 in the thickened lower end of the sleeve 30. Reduced diameter ends of the detents slide in holes 43 in the fuse body 27. The detents are pressed radially outward by a coil spring 43a sufficiently strong to resist hydrostatic pressure until a minimum safe depth, about 50 feet, has been reached.

An initiator propellant charge 44 is contained in a cartridge 44a which is housed in the upper chamber 36 of the fuse base 35 and a firing pin 45 for said cartridge is positioned for sliding movement in the lower chamber 37 of the fuse base 35.

The firing pin 45 extends from a cylindrical portion 46 fitting in the lower chamber 37 and extending beyond the open end 47 of said chamber. Ball detents 48 are confined between the end 49 of the fuse base, the inner surface of the sleeve 30 and shallow depressions 50 in the surface of the extending portion of member 46. The ball detents prevent movement of said cylindrical portion 46 and firing pin 45 until the striker 32, on contacting the sea bottom, moves the sleeve 30 sufficiently to align a peripheral ball release groove 51 in the inner surface of the sleeve with the ball detents thus freeing the ball detents.

A firing spring 52 is positioned under compression between the lower end of the sleeve 30 and the end of cylindrical portion 46 of the firing pin mechanism. Spring 52 is therefore stressed until member 46 is released. When member 46 is released the spring 52 drives member 46 and therefore the firing pin 45 against the initiator propellant charge 44 causing explosion thereof.

The pressure of the exploding charge 44 is transmitted to the firing mechanism 21 for the main penetration propellant load cartridge 18 through liquid filling passages in the anchor leading from the discharge end of cartridge 44a to the firing mechanism as later described.

A short cylindrical member 53 constituting a fluke base is screwed at its upper end to the lower end of the piston rod 19 and is held by shearable pins 53a to the sliding block 22. At its lower end member 53 is screwed to the upper end of the fuse base 35. A chamber 54 is recessed into the lower end of member 53 and small ports 55 are drilled through the wall of the chamber for the entry of sea water. Vertical passages 56 indicated by dotted lines in FIGURE 4 are drilled through member 53 which connect chamber 54 with the axial bore 20 through piston rod 19.

A transverse opening 57 is formed through member 53 passing between passages 56 and a pivot pin 58 is mounted in member 53 to extend across opening 57.

The anchor flukes 59 and 60 are spade-like members having central reinforcing ribs 61, 62, projecting beyond the base of flukes as flat bars 63, 64, drilled with holes by which the bars are mounted on pivot pin 58. The upper and lower edges 65, 66 of the opening 57 position the flukes when in upward position and solidly support the flukes when in operative position.

Figure 3A:
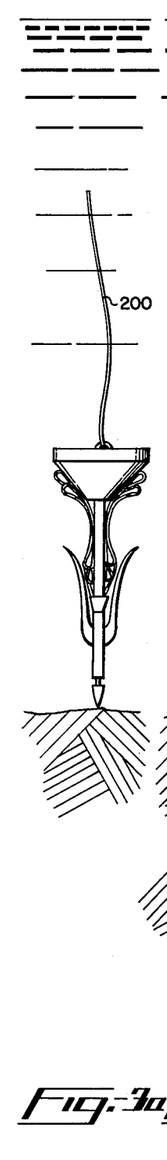
FIGURES 3a, b and c, are sketches, drawn on a small scale, showing successive positions of the anchor as it strikes the ocean bottom and is embedded therein.
Figures 3B, 3C, 4:
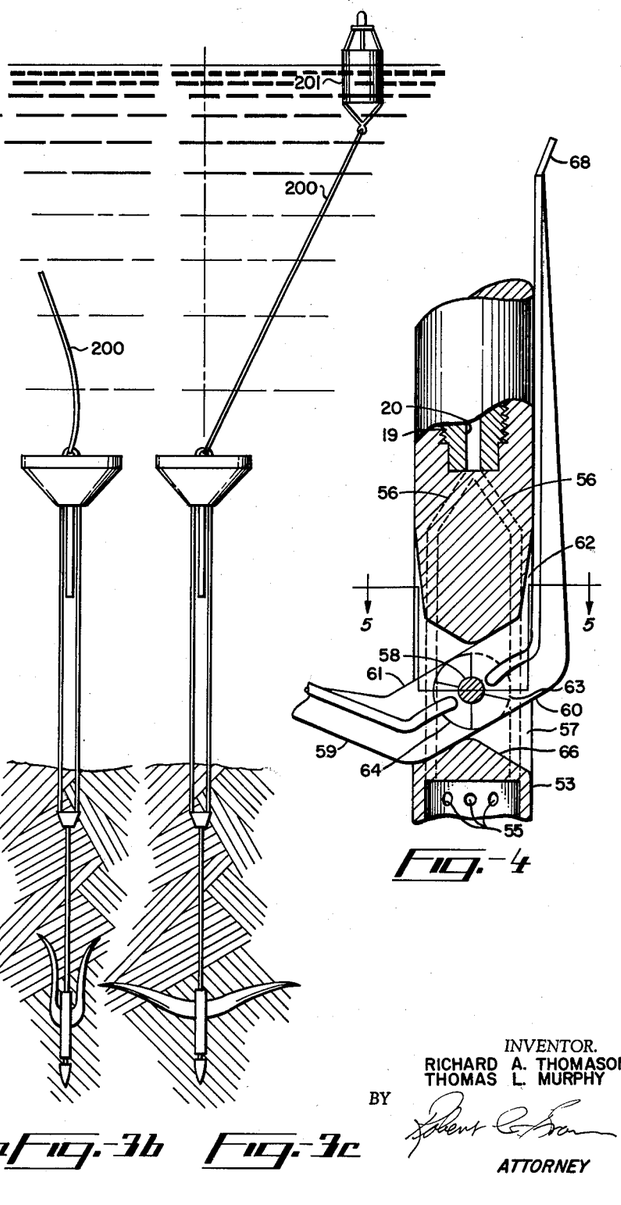
Figure 5:
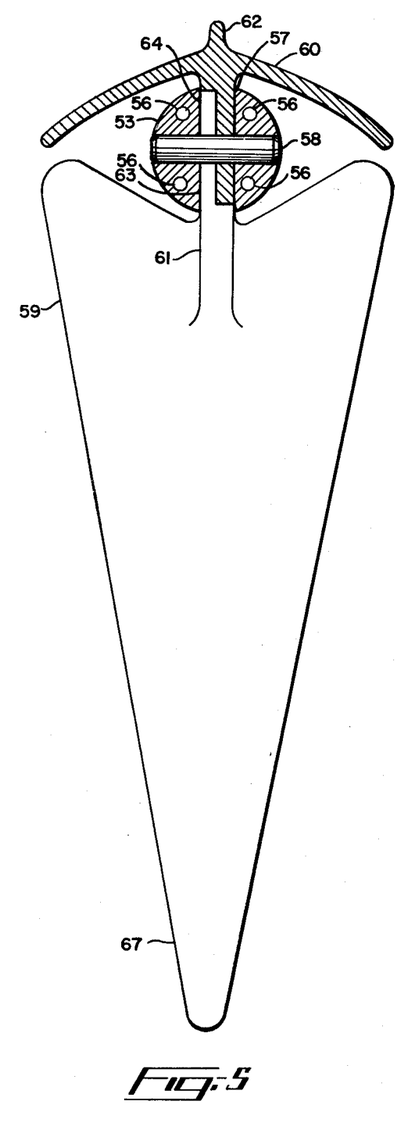
FIGURE 5 is a cross-section on the line 5—5 of FIGURE 4.

It will be noted from FIGURES 4 and 5 that the outer ends 67, 68 of the flukes are angled outwardly from the fluke blade to facilitate the engagement of the flukes with the wall of the vertical hole made in the sea bottom, when the anchor is given and upward movement, and to aid in moving the flukes into horizontal operative position.

It will be noted that in the embodiment of the invention shown in FIGURES 1 and 2 there is provided a manually operated safety element in pull pin 31 and an automatically operated safety system in the pressure operated detents 41 and in the pressure transmitting liquid columns in passages 56 and 20, the sea water having to substantially completely fill the chamber 54 and passages before the firing of the main penetration load 18a can be effected. Alternatively, the chamber 54 and passages 56 may be constructed as an additional manually operated safety system by substituting filling openings closable by studs and filling the chamber and passages with liquid before the anchor is put into service.

It is pointed out that more than one pair of flukes may be provided by fitting them at a different level in the fluke base member 53 in position to avoid interference with the other flukes, or by fitting together two separate fluke base members with their flukes.

Also it would be possible to transmit the movement of the striker on impacting sea bottom directly to the firing mechanism of the main penetration load cartridge but it is preferred to provide an initiator charge to operate the main charge because of the more positive operation obtained in the functioning of the anchor.

In using the propellant operated anchor shown in FIGURES 1 and 2, the anchor, which may be stored safely with the initiator charge 44 in position since it cannot be fired until the hydrostatically released detents 41 are released and the striker is under pressure, is armed by unscrewing the breech block 15 and screwing the main penetration charge cartridge 18 into position. After the breech block is replaced and a length of mooring line 200 is secured to eye 16, the anchor is swung overboard and dropped. The anchor will be automatically activated after it has reached a given depth by disengagement of the hydrostatic detents 41 from the fuse body 27 freeing the sleeve 30 for relative upward movement with respect to the tubular case 28 when the striker impacts sea bottom as seen in FIGURE 3a. When the initiator propellant charge 44 has fired, the pressure of the released gases is transmitted through the liquid filled passages 56 in the fluke base 53 and through axial passage 20 in the piston rod 19 to the firing mechanism 21 which detonates the main propellant load 18a. The pressure of the gases released by the main propellant load 18a acts to both move breech block 15 upwardly with the cylinder 10 to which it is secured, which movement is resisted by the weight of water in the reactance member 11, and to drive the piston 17 and piston rod 19 downwardly, carrying with it the lower portion of the anchor and driving it into the sea bottom. The piston rod 19 in this movement first shears pins 53a and then the piston 17 impacts the upper surface of sliding swivel block 22, shearing pins 23 and breaking cable 25 loose from its ties 26. FIGURE 3b shows the condition of the anchor assembly at the instant of arrest of upward movement of the reaction member 11 and of greatest penetration downwardly of the lower portion of the anchor into the sea bottom. The anchor flukes are then embedded by a short upward pull on the mooring line 200 shown both in dotted and full lines in FIGURE 3c which is thereafter secured to a mooring buoy 201.

Figure 6:
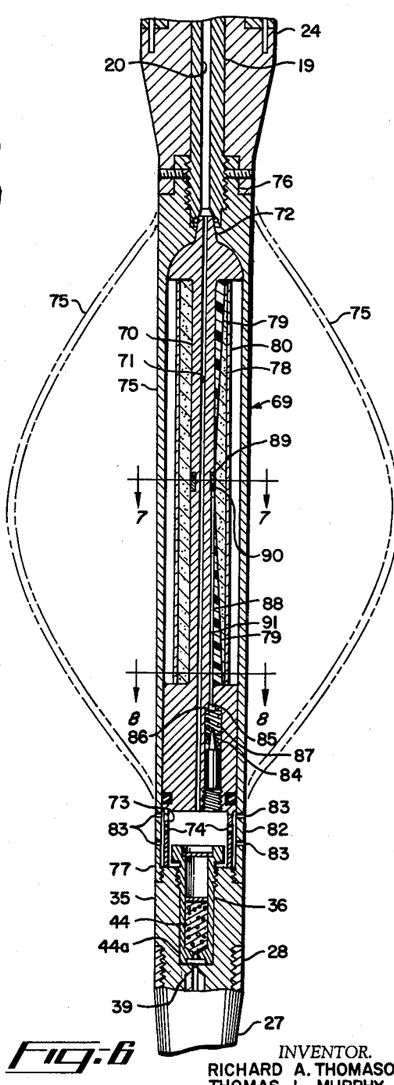
FIGURE 6 is a fragmentary central longitudinal view, partially in section, showing a modified form of the embedment anchor in which flukes are substituted by a distendable assembly.

In the modification of the embedment anchor shown in FIGURE 6 the fluke base 53 with flukes pivotally mounted thereon is substituted by a novel laterally expandable member indicated generally by numeral 69.

The novel member 69 is designated "the lantern" and comprises a rod-like backing member or liner 70 provided with a central axial bore 71 aligned with the bore 20 in the piston rod 19. The upper end of the backing member 70 is connected to piston rod 19 by an interfitting joint 72. The lower end of the backing member is thickened and provided with a recess 73 which overlies the upper end of the initiator charge cartridge 44a mounted in the fuse base 35. Holes 74 are provided through the wall of the recess 73 for a purpose later explained.

Figure 7:
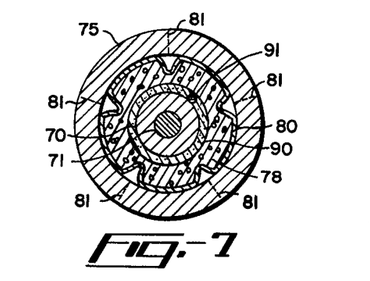
FIGURE 7 is a section on line 7—7 in FIGURE 6.
Figure 8:
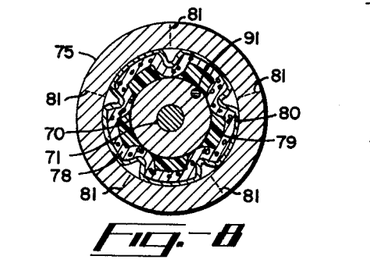
FIGURE 8 is a section on line 8—8 in FIGURE 6.

A shell member 75 of steel is screwed at its upper end 76 to piston rod 19 and at lower end 77 to the fuse base 35. The shell 75 is spaced from the backing member 70 and a shaped charge of high explosive 78 is arranged as a sleeve around the backing member. A charge shaper 79 between the backing member and the high explosive provides a sleeve for the explosive which is thickest at the midpoint of its length (see FIGURES 6 and 7) and thinnest at its ends (see FIGURE 8). The usual liner 80 to establish concentrations of the explosive force utilizing the well-known Monroe effect is provided and is effective to cause cutting of the shell along a plurality of axial lines as indicated at 81 when the shaped charge is fired.

The shell 75 is provided toward its lower end 82 with small holes 83 through which sea water can enter recess 73 and fill the longitudinal passages in the backing member 70 and piston rod 19.

The shaped charge 78 is fired by means of a firing pin 84 and primer element 85 mounted in a chamber 86 drilled into the thickened end of the backing member, the firing pin 84 being normally held away from the primer 85 by a weak spring 87. A passage 88 is drilled from the primer 85 longitudinally through the wall of the backing member to connect with a peripheral groove 89 in the outer surface of the backing member 70 at the midlength of the shaped charge. A booster charge 90 is placed in the groove 89 and a slow burning delay fuse 91 is packed into passage 88 and connects primer 85 with booster charge 90.

Figure 9:
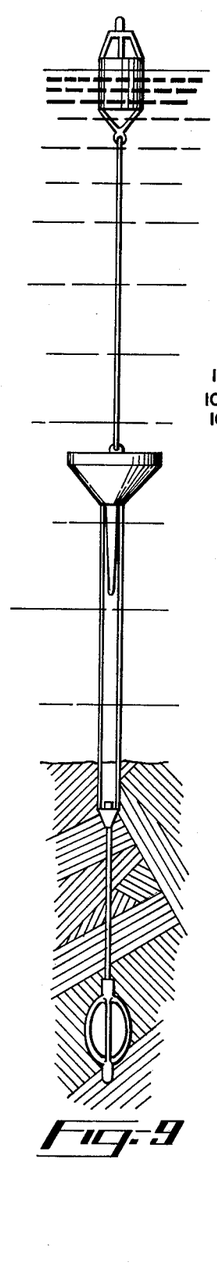
FIGURE 9 is a sketch, drawn on a smaller scale, showing the modified embedment anchor of FIGURE 6 in operative position.

As the anchor strikes sea bottom causing firing of the main penetration load propellant cartridge as explained with reference to FIGURES 1 and 2 the sudden downward thrust on piston 19 and the inertia of the free sliding firing pin 84 overcomes the resistance of the weak spring 87 and the firing pin strikes and ignites the primer 85 and starts combustion of the delay fuse 91 which is timed to fire the booster charge 90 and shaped charge 78 when time for maximum penetration has elapsed. Explosion of the shaped charge cuts the shell member 75 along the plurality of vertical lines 81, and bulges the strips, which remain circumferentially connected at top and bottom, into a lantern shape as indicated in FIGURE 6 in dotted lines. The shape of the lantern will firmly hold the anchor in the sea bottom as shown in FIGURE 9.

Referring now to the modification of the anchor shown in FIGURES 10–14 the form of anchor is designed for use on sea bottoms having subsurface rock, coral or coral heads, lava flows, rock outcropping and the like, though not applicable to bottoms of decomposed coral, small boulders, aggregate or rubble, that is, where the overburden is insufficient to afford sufficient weight to hold down flukes or the distending attachments.

In this embodiment all parts from and including the fuse base to the upper end of the embedment anchor are essentially the same as previously described with reference to FIGURES 1 through 5.

Figures 10, 11A:
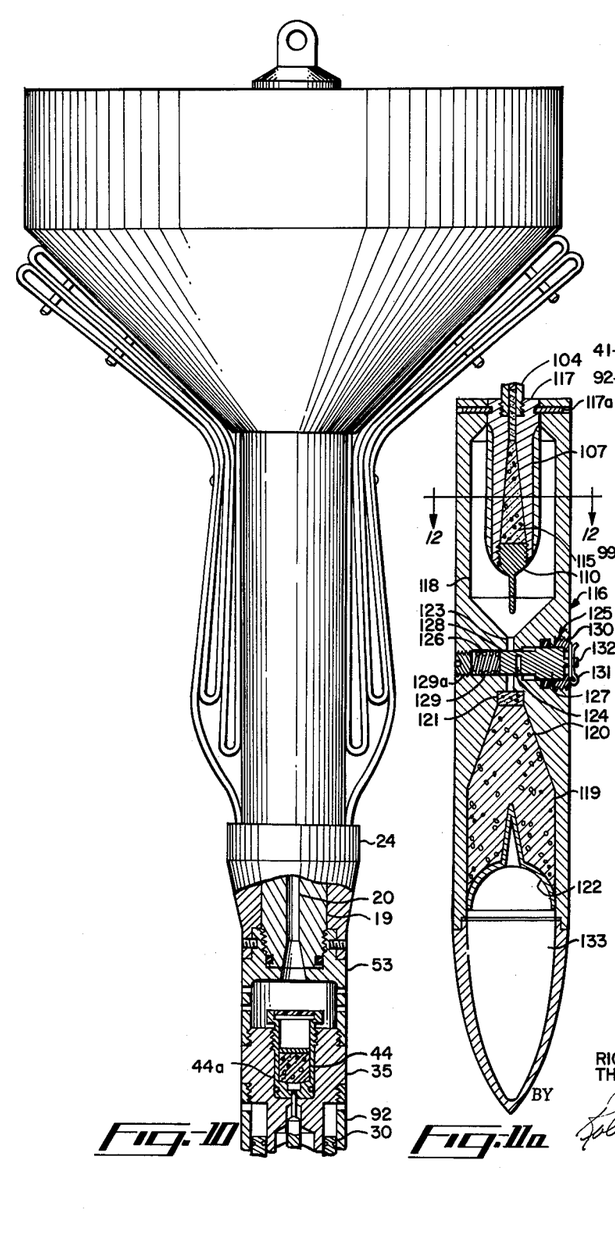
FIGURE 10 is a central longitudinal view, partially in section, of a further modified form of the embedment anchor showing the upper portion thereof.
FIGURE 11a is a similar view to FIGURE 10 but showing the lower portion of the anchor.
Figure 11:
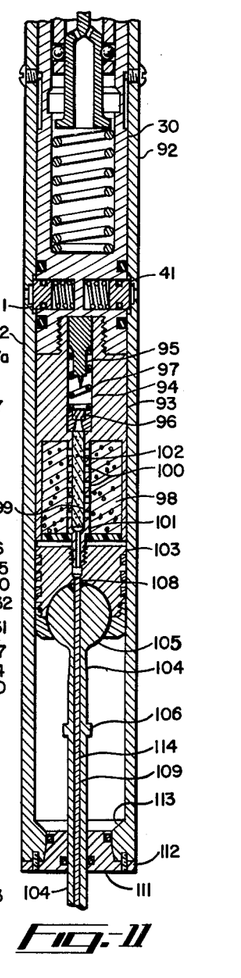
FIGURE 11 is a similar view to FIGURE 10 but showing the intermediate portion of the anchor.

The novel attachments are designated generally as the follow-through-spike assembly which is connected below the fuse assembly comprised of the fuse base 35 connected in this modification by an adaptor 53 directly to the lower end of the piston rod 19. The fuse body 27 in FIGURE 2 is replaced by a tubular member 92 which contains the sleeve 30 into which elements of this modification are screwed. Axial movement of the sleeve 30 in tubular member 92 is prevented by hydrostatically operated safety detents 41 mounted in the sleeve 30 and engaging in the tubular member 92, until the anchor is a safe distance below the surface.

A cartridge base 93 is screwed into sleeve 30, and is provided with an axial bore 94 in which a firing pin 95 is mounted for sliding movement to strike a primer 96 when downward movement of the anchor is arrested abruptly by impacting hard sea bottom substrate. The firing pin 95 is normally held away from the primer 96 by a weak spring 97.

The end of the cartridge base opposite the bore 94 containing the firing pin 95 is peripherally chambered to receive a charge of propellant 98. The bore 94 is continued as an axial passage 99, passages 100 being provided in the wall of the axial passage 99 leading into the chamber containing the charge of propellant 98. The cartridge base is provided with a short axial extension 101 through which passage 99 extends. The outer surface of extension 101 is provided with a short length of fine thread. Passage 99 is filled with igniter material 102 which is set into combustion by primer 96 which in turn ignites the charge of propellant 98.

The lower portion of tubular member 92 functions as a cylinder or spike gun tube in which there is slidably mounted a piston head 103 formed to provide a socket for the spike rod 104 which is formed with a ball 105 at its upper end, with a collar 106 adjacent the ball 105 and destortable jaws 107 at its lower end.

Figure 12:
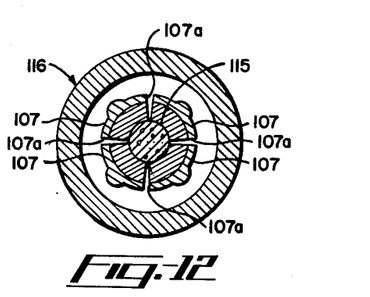

The piston head 103 is provided with an axial passage 108 having an interior thread by which it may be screwed on extension 101 of the cartridge base 93, the axial passage 108 extending through the piston head and aligning with an axial passage 109 through the spike rod and through the center of the distortable jaws 107. The jaws are parallel at their lower ends and threadedly secured to a firing pin 110. As seen in FIGURE 12, the jaws 107 are four in number divided by cutting lines 107a, it being understood that any number of jaws may be provided.

The lower end of tubular member 92 is closed by a cap 111 detachably secured as by pressed-in-pins 112 in the end of member 92. It will be noted that the lower end of member 92 is provided with an interior shoulder 113 to prevent the piston head 103 and ball 105 secured thereto from leaving the tubular member 92.

The axial passage 109 is filled with a slow burning material 114 and serves as a delay train to ignite a charge of explosive 115 positioned within the jaws.

A striker subassembly generally indicated by 116 is mounted on the head 117 of the jaws 107 and is held from axial movement by shear pins 117a. The upper end of the head 117 and subassembly is spaced sufficiently from cap 111 to enable an initial upward movement of rod 104 to take place.

Sub-assembly 116 comprises a cylindrical member chambered in its upper portion 118 to fit over jaws 107 and in its lower portion 119 to receive a charge of high explosive 120 with booster 121 therefor and a shaped liner 122. A passage 123 connects the chambers and primer 124 is arranged in a safety and arming element 125 which is mounted for sliding movement in a transverse bore 126 intersecting passage 123.

The safety and arming device 125 comprises a plug having a head portion 127 of greater diameter than its stem 128, bore 126 being given corresponding dimensions, the large diameter portion of the bore being long enough to permit inward travel of the head 127 of the plug sufficient to position primer 124, under hydrostatic pressure, in the path of travel of the firing pin 110. A coil spring 129 of predetermined resistance is arranged between the inner end of stem 128 and an adjustable nut 129a in one end of bore 126, and a ring nut 130 in the other end of the bore retains the plug in the bore. A cotter pin 131 may be used, passing through a hole in an upstanding ear 132 on the top of head portion 127 of the plug, to prevent inward movement of the plug until the cotter pin is removed, which operation arms the high explosive portion of the device.

The lower end of member 116 is terminated by a striker and stand-off element 133 fitted to member 116, and disintegrated with adjacent parts by the detonation of the high explosive 120 and the explosive 115 within the jaws 107 leaving the latter free to be drawn into the hole formed by the shaped charge.

In the operation of the follow-through-spike modification the sea bottom may be rock covered by a thin overburden of sand, sludge, and decayed rock. First cotter pin 131 is removed from the safety and arming element 125 and then the anchor is thrown into the water. When the striker 133 of the anchor is slowed down by striking the overburden, the initiating charge 44 will be fired as explained with reference to the other embodiments of the invention resulting in tubular body 92 and member 116 being driven downwardly until abruptly stopped by the rock strata.

Figures 13, 14:
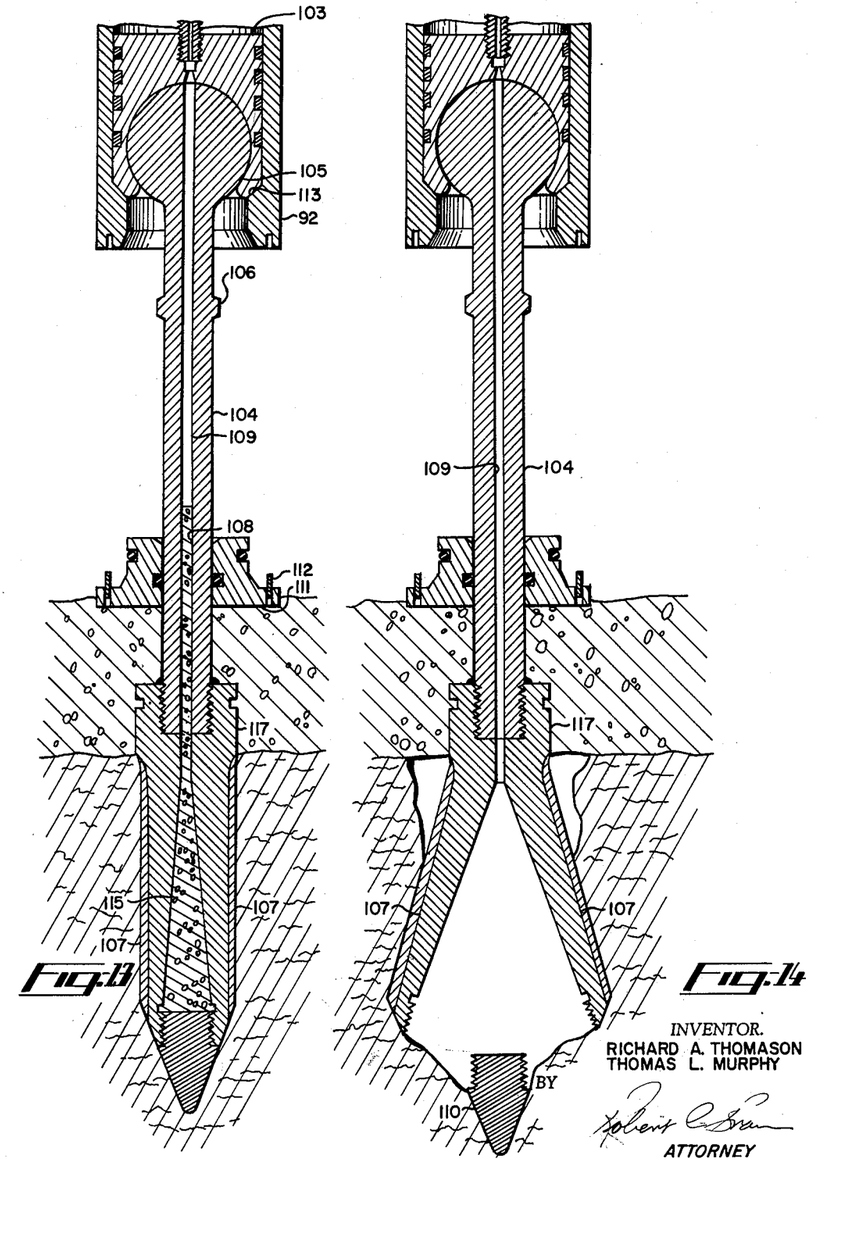
FIGURE 13 is an enlarged fragmentary central longitudinal section of the lower end of the anchor shown in FIGURES 11 and 11a, the position of the parts being that just before the anchor is finally set.
FIGURE 14 is a view similar to that of FIGURE 13 but showing the position of the parts after the anchor is finally set.

The abrupt stoppage of downward movement of these members results in the firing pin 95, slidably mounted in cartridge base 93, being thrown by its own inertia against primer 96 igniting propellant charge 98 and delay train 114. Charge 98 drives the piston head 103 and spike rod 104 downwardly shearing pins 117a. Since the spike rod is guided by its ball and socket joint within the piston head 103 the firing pin 110 is driven against primer 124 which has been automatically aligned with the firing pin by hydrostatic pressure, and detonation of the shaped penetration charge 120 occurs, blowing a deep hole into the rock. Detonation of charge 120 also fragments the structure surrounding and in front of the jaws 107 so that continued downward movement of the spike rod 104 under the impetus given by charge 98 causes the rod to be lodged into the hole in the rock as seen in FIGURE 13. Substantially simultaneously detonation of the charge 115 positioned between the jaws 107 is affected by the slow burning delay train 114 thereby spreading the jaws and embedding them in the walls of the hole in the rock as seen in FIGURE 14.

It is pointed out that the components of the various modifications of the anchor may be combined in various ways and may be differently arranged than described, for instance in the form first described a second pair of flukes could be arranged below and transverse to the first pair of flukes. If test cores taken of the sea bottom formation show a sufficient thickness of soft bottom a fluke section may be readily inserted in the length of the anchor.

While preferred embodiments of the invention have been herein described and shown by way of illustration, it is to be understood that various changes can be made in the form, details, arrangement, and proportions of the various parts without departing from the spirit and scope of the invention as defined by the appended claims.

We claim:
1. An underwater embedment anchor comprising: an elongated cylinder, forming the upper portion of the anchor, having the upper end closed and provided with a mooring eye; a piston and piston rod mounted in the cylinder, said piston rod being of a length when positioned in upward position to extend below the lower end of said cylinder, said piston rod having an axial bore therethrough; a cartridge containing a propellant charge and primer mounted above said piston; firing pin means mounted at the upper end of said bore through the piston rod; an open ended water trapping part mounted with its open end upward on the cylinder and effective to oppose the upward reaction of said cylinder when the propellant charge is fired; a sliding block mounted in the open end of said cylinder having a bore for the passage of said piston rod; folded cables secured to said cylinder and to said sliding block, readily broken means holding said folded cables in folded condition; an elongated body co-axially connected to said piston rod below said sliding block; means mounted on said body effective to engage in the sea bottom and hold the anchor in position; a sea bottom impacting member extending from the bottom of said elongated body; means within said elongated body responsive to the upward movement of said impacting member to furnish energy; and means to transmit said energy through said piston rod bore to the firing pin means to detonate said primer and said propellant charge.

2. An underwater embedment anchor as set forth in claim 1 and in which said elongated body inclues a plurality of co-axial parts secured together, shearable means connecting the uppermost of said parts to said sliding block, the lowermost of said parts formed as a hollow cylinder, and the intermediate part secured to said uppermost and lowermost parts; said means responsive to the upward movement of said impacting member including an initiator charge mounted in the upper portion of said intermediate part, firing means for said initiator charge mounted in the lower portion of said intermediate part, said impacting member having a portion slidably mounted in said hollow cylinder and effective when moved upwardly on impacting sea bottom to move said firing means against said initiator charge to fire said initiator charge, passages in said uppermost part in registration with said initiator charge and with said bore in the piston rod for transmitting the pressure developed by the firing of the initiator charge to the firing pin means of the propellant charge to fire said propellant charge.

3. An underwater embedment anchor as set forth in claim 2 and in which openings are provided through the wall of said uppermost part in communication with said passages to admit sea water thereto.

4. An underwater embedment anchor as set forth in claim 2 and in which hydrostatic pressure responsive detent means are provided for holding said portion of the impacting member in the lower end of said hollow cylinder, said detent means being overcome by a predetermined value of pressure.

5. An underwater embedment anchor comprising: an elongated cylinder, forming the upper portion of the anchor, having the upper end closed and provided with a mooring eye; a piston and piston rod mounted in the cylinder, said piston rod being of a length when positioned in upward position to extend below the lower end of said cylinder, a cartridge containing a propellant charge and primer mounted above said piston; an open ended water trapping means mounted with its open end upward on the cylinder and effective to oppose the upward reaction of said cylinder when the propellant charge is fired; a sliding block mounted in the open end of said cylinder having a bore for the passage of said piston rod; folded cables secured to said cylinder and to said sliding block, readily broken means holding said cables in folded condition; an elongated tubular shell member co-axially connected to the piston rod below the sliding block; an elongated element having an axial bore therethrough mounted in said shell member; shaped charge means surrounding said elongated element and exerting energy when fired to shear the shell member along spaced longitudinally extending cutting lines thereby bowing outwardly the sheared portions of the shell member; a sea bottom impacting member connected to said shell member, and means responsive to the impact of said impacting member with sea bottom to detonate said propellant charge and said shaped charge means.

6. An underwater embedment anchor as set forth in claim 5 wherein said last mentioned means includes a delay train of slow burning explosive connected to said shaped charge means and firing pin means effective to ignite said delay train upon impact of said impacting member with sea bottom whereby detonation of said shaped charge means will occur a short instant after detonation of said propellant charge.

7. An underwater embedment anchor as set forth in claim 5 wherein said last mentioned means includes a circumferential groove in the surface of said elongated element midway of the length of said shaped charge means, a closed chamber in the lower end of said elongated element, a passage in said elongated element connecting said circumferential groove and said closed chamber, a primer positioned in the lower end of said passage, a firing pin slidably mounted in the lower portion of said closed chamber, resilient means biasing said firing pin away from said primer, and a delay train of slow burning explosive in said passage; whereby impact of said impacting means with sea bottom forces said primer against said firing pin to ignite said delay train thereby effecting delayed detonation of said shaped charge means.

8. An underwater embedment anchor as set forth in claim 5 and in which said water trapping means effective to oppose upward reaction of the cylinder comprises a rigid hollow impervious member having a frusto-conical bottom with its end of smallest diameter mounted co-axially on said cylinder.

9. An underwater embedment anchor as set forth in claim 5 wherein said piston rod is provided with an axial bore through the length thereof, said piston rod bore being aligned with said bore in said elongated element; and said means responsive to the impact of said impacting member with sea bottom for detonating said propellant charge and said shaped charge means including a firing pin in the upper end of said piston rod bore adjacent said propellant charge, an intermediate part and a sleeve connecting the lower portion of said shell member to said impacting member, an initiator charge in the upper end of said intermediate part, and firing means for said initiator charge mounted in the lower end of said intermediate part; said sea bottom impacting member slidably mounted in said sleeve and effective when pushed into the sleeve upon impacting sea bottom to move said firing means against said initiator charge to detonate the latter; said bore in the elongated element being in registration with the discharge end of the initiator charge whereby the force of said initiator charge when detonated will be transmitted to the firing pin in said piston rod bore to fire said propellant charge.

10. An underwater embedment anchor comprising: an elongated cylinder, forming the upper portion of the anchor, having the upper end closed and provided with a mooring eye; a piston and piston rod mounted in said cylinder, the piston rod being of a length when positioned in upward position to extend below the lower end of said cylinder, said piston rod having an axial bore therethrough; a cartridge containing a propellant charge and primer mounted above said piston; firing pin means mounted at the upper end of said bore through the piston rod; an open ended water trapping part mounted with its open end upward on the cylinder and effective to oppose the upward reaction of said cylinder when the propellant charge is fired; a sliding block mounted in the open end of said cylinder having a bore for the passage of said piston rod; folded cables secured to said cylinder and to said sliding block, readily broken means holding said folded cables in folded condition; a tubular member co-axially mounted on said piston rod below said sliding block; an initiator charge and firing means therefor mounted in said tubular member; means including a sleeve mounted in said tubular member to operate said firing means upon relative upward movement of said sleeve with respect to said tubular member; a cartridge base secured to the lower end of said sleeve, a charge of propellant and inertia operated firing means for said charge of propellant mounted in said cartridge base; a second piston mounted in said tubular member below said cartridge base; a spike with a rod-like part having an upper end secured to said second piston and having its lower end extending below said tubular member; said tubular member having an inwardly projecting flange at its lower end to prevent the spike from leaving the tubular member; deformable jaw means mounted on the lower end of the rod-like part of said spike; a tubular case mounted on the exposed lower portion of said spike; a shaped charge positioned in the lower end of said tubular case; additional firing means including a primer for said shaped charge operated by the downward movement of said spike to detonate said shaped charge; and a sea bottom impacting means rigidly secured to the lower end of said tubular case.

11. An underwater embedment anchor as set forth in claim 10 and in which said rod-like part of the spike is provided with an axial bore; a delay train of slow burning explosive positioned in said bore in said rod-like part and ignited by the firing of the charge of propellant in said cartridge base; said jaw means on the lower end of said rod-like part of the spike being formed to provide a rupturable closure; a charge of explosive positioned in said closure and exploded by said delay train when the jaw means has been received in the hole made by the detonation of the shaped charge.

12. An underwater embedment anchor as set forth in claim 10 and in which a hydrostatically operated safety plug is positioned in said tubular case, said primer for the shaped charge being positioned in said plug, and resilient means holding said plug in position such that the primer positioned in the plug is out of the path of movement of said spike until hydrostatic pressure displaces said plug, the firing of the primer with consequent detonation of the shaped charge disrupting the parts lying in the path of movement of the spike and the deformable jaw means carried thereon enabling the jaw means to be received in the hole formed by detonation of the shaped charge.

References Cited in the file of this patent

UNITED STATES PATENTS

| 804,900 | Templeman | Nov. 21, 1905 |
| 2,269,646 | Burke | Jan. 13, 1942 |
| 2,993,461 | Feiler | July 25, 1961 |
| 3,018,752 | Sorrell | Jan. 30, 1962 |
| 3,032,000 | Feiler | May 1, 1962 |
| 3,054,123 | Moeller | Sept. 18, 1962 |

FOREIGN PATENTS

| 71,388 | Norway | Dec. 16, 1946 |